United States Patent Office 3,198,735
Patented Aug. 3, 1965

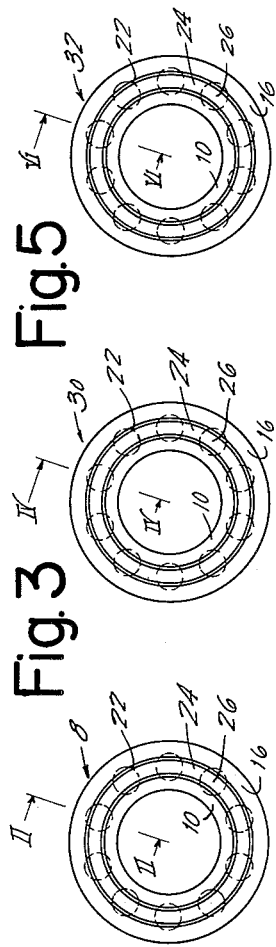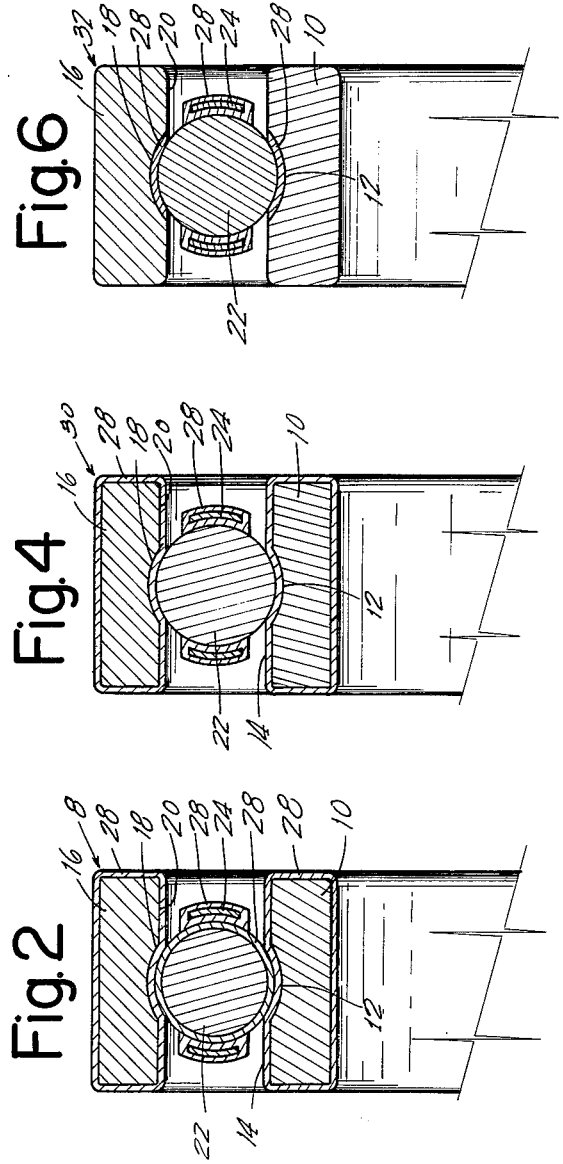

3,198,735
SOLID LUBRICANT COMPOSITION AND METHOD FOR LUBRICATING ANTI-FRICTION BEARING STRUCTURES
Edward R. Lamson, Greentree Road, R.D. 4, Sewell, N.J., and Martin J. Devine, 2560 Prescott Road, Havertown, Pa.
Filed Oct. 20, 1961, Ser. No. 146,664
4 Claims. (Cl. 252—25)
(Granted under Title 35, U.S. Code (1952), sec. 266)

The invention described herein may be manufactured and used by or for the Government for governmental purposes without the payment of any royalties thereon.

This invention relates to the lubrication of anti-friction bearings which are subjected in use to mechanical friction. More specifically, the invention is concerned with lubricants of the solid film type, that is, lubricants that take the form of a solid lubricating material permanently applied as a film to the surface to be lubricated.

In a co-pending application, Serial No. 50,046, now Patent No. 3,079,204, the inventors teach bonding a dry film lubricant to the component parts of an anti-friction bearing using a metallic silicate as the bonding agent. An anti-friction bearing thus lubricated can operate for long periods of time despite extreme variations in temperature and pressure.

These anti-friction bearings having a dry film lubricant bonded to their component parts with a metallic silicate proved to be very satisfactory in overall performance. However, an advantage of other inorganic bonding agents over the silicates is that a wider range of compatability can be realized since sodium silicate reacts instantaneously on contact with certain lubricating solids producing a solid mass or heavy fluid which is essentially non-sprayable. Therefore, the inventors have improved upon the silicate bonded films by using either a metallic phosphate or a borate as the bonding agent.

Accordingly, one of the objects of the present invention is to provide an anti-friction bearing lubricated with a bonded film lubricant wherein the dry film is bonded to the component parts of the bearing with either a water soluble metallic phosphate or a water soluble metallic borate.

Another object of the invention is to provide an anti-friction bearing with a bonded film lubricant.

Another object of the invention is to provide a lubricated anti-friction bearing having an improved wear life and load carrying capacity.

Another object of the invention is to provide a bonding agent which is compatible with a greater number of dry lubricants than were compatible with the silicate bonding agent.

Other objects and many of the attendant advantages of this invention will be readily appreciated as the same becomes better understood by reference to the following detailed description which is considered in connection with the accompanying drawings wherein:

FIG. 1 is a side elevation of a ball bearing illustrating a preferred embodiment of the invention;

FIG. 2 is an enlarged section taken along the line II—II of FIG. 1;

FIG. 3 is a side elevation of a ball bearing illustrating another embodiment of the invention;

FIG. 4 is an enlarged section taken along the line IV—IV of FIG. 3;

FIG. 5 is a side elevation of a ball bearing illustrating another embodiment of the invention; and FIG. 6 is an enlarged section taken along line VI—VI of FIG. 5.

Referring more particularly to the drawings wherein like structural details and components are designated by like reference numerals, FIGURES 1 and 2 show an anti-friction bearing 8 of the ball-type having components including an inner ring or race means 10 provided with a circumferentially extending groove or raceway 12 in the outer periphery 14 thereof and an outer ring or race means 16 provided with a circumferentially extending groove or raceway 18 in the inner periphery 20 thereof. A plurality of substantially spherical rolling elements or balls 22, in this instance ten in number, are carried in the raceways 12 and 18 and, due to a predetermined curvature of the raceways 12 and 18, are confined therein for rotary movement in a substantially circular orbit between the inner and outer race means 10 and 16. A predetermined clearance or tolerance (not shown in the drawings) between the balls 22 and the raceways 12 and 18 permits the balls 22 to roll freely over the surfaces of the raceways.

A separator or cage means 24 is carried by the balls 22 and serves to space the balls 22 a uniform or equal distance apart in order to equalize any load that may be applied to the balls 22 through the races 10 and 16. The cage means 24 is provided with a plurality, in this instance eight, of pockets or the like 26 therein (FIG. 1) each of which (FIG. 2) is adapted to receive a ball 22. The inner periphery of each pocket 26 is provided with a predetermined curvature and is adapted to be carried on and thus frictionally engage the peripheral surface of its received ball 22.

The components of the anti-friction bearing 8 in this preferred embodiment of the invention are made of steel but may be made of any other material suitable for bearing use such as iron, stainless steel, etc. Various alloys of steel and stainless steel have been found to be particularly satisfactory materials for use in the construction of high speed and high temperature anti-friction bearings. Inasmuch as the structure and function of ball-type anti-friction bearings as well as the materials utilized in the construction thereof are well known in the art and per se form no part of the present invention, further discussion thereof is deemed unnecessary. Suffice it to say that in the use or environment application of the bearing 8, the inner race means 10 is adapted to receive a shaft or the like (not shown) which when rotated will also rotate the inner race means 10 and thereby impart rotation to the balls 22.

As best seen in FIGURE 2, all of the components 10, 16, 22 and 24 of the bearing 8 carry a lubricating film or coating 28 which completely surrounds or envelops each of the components.

The lubricant film 28 comprises lubricant particles bonded to the above mentioned component parts of the bearing 8. In this embodiment, the bonding agent for the film consists of one from a group consisting of dried water soluble metallic borates and a dried water soluble metallic phosphate. The lubricant particles may be of various materials capable of serving as lubricants covering a range from −296° F. up to as high as 750° F. Several typical lubricant materials being:

| | |
|---|---|
| Graphite | Nickel fluoride |
| Lead oxide | Molybdenum oxide |
| Indium fluoride | Lead iodide |
| Cadmium fluoride | Lead sulfide |
| Cuprous chloride | Lead fluoride |
| Barium oxide | Bismuth iodide |
| Silver sulphate | Zirconium iodide |
| Molybdenum disulfide | Strontium oxide |
| Cadmium iodide | Manganese chloride |
| Zinc sulphate | Barium sulfide |
| Zirconium chloride | |

The size of the lubricant particles is not critical. However, it has been found that a solid comminuted lubricant having a particle size not greater than 7 microns provides a better lubricating action than a lubricant of larger particle size.

In some cases, particles of two or more different lubricant materials may be incorporated in the film composition. For example, molybdenum disulfide and graphite have been employed together. If it is desired to use more than one lubricant in the bonded film, the lubricants selected can be mixed in equal or dissimilar proportions and the particle size of the lubricants may also be varied. The selection of a single lubricant as opposed to a blend of two or more will depend on the environmental application of the lubricated bearing, and the desired performance for the lubricated bearing. The thickness of the film utilized will in general be determined by the geometry of the bearing.

Anti-friction bearings lubricated in accordance with the preferred embodiment of this invention and operated at shaft speeds of 10,000 r.p.m. with light radial and thrust loads applied to the bearings have been found to perform satisfactorily for many hours without a failure or breakdown of the bonded film lubricant.

FIGURES 3 and 4 show another embodiment of the invention wherein all of the components of an anti-friction bearing 30 except the balls 22 thereof are coated with a bonded film lubricant 28. Bearing 30 is otherwise identical in all structural details to bearing 8 shown in FIGURES 1 and 2, and the thickness of the bonded film 28 within the limits hereinbefore discussed in connection with the preferred embodiment of the invention as well as the constituent mixture of the bonded film 28 is strictly a matter of choice which is again dependent on the environmental application of bearing 30 and the conditions under which it is expected to operate. Performance tests have indicated that an anti-friction bearing lubricated in accordance with this embodiment of the invention will operate satisfactorily for many hours at shaft speeds of 10,000 r.p.m. with relatively heavy radial and axial loads applied to the bearing without failure of the bonded film 28.

FIGURES 5 and 6 show another embodiment of the invention wherein an anti-friction bearing 32 is provided with a bonded film lubricant on only the cage means 24 and the raceways 12 and 18 thereof. Bearing 32 is otherwise identical in all structural details to bearings 30 of FIGURES 3 and 4. Bearing 32 has generally been found to have performance characteristics substantially identical to the performance characteristics of bearing 30; however, its chief advantage over bearing 30 has been found to reside in certain environmental applications of the bearing wherein the widths of the bearing race means 10 and 16 and the outside diameter of the outer race means 16 are critical. By eliminating the bonded film lubricant on the two race means other than coating the surface of the raceways 12 and 18 thereof, the maximum outside dimensions of the two race means can be somewhat reduced.

*Method*

The preferred method of lubricating anti-friction bearings and more particularly high speed and high temperature ball-type bearings is comprised of the following steps, the method being operable to produce a lubricated bearing substantially identical to the lubricated anti-friction bearing shown in FIGURES 1 and 2. The components of an unassembled ball bearing the inner and outer race means, the balls or rolling elements and the cage means, are first cleansed to effect the removal of any contaminating foreign matter from the external surfaces thereof, particularly the removal of oils and greases. The components are cleaned in this preferred embodiment by vapor degreasing with a trichloroethylene vapor, although it will be apparent that the components could be cleaned in any other suitable manner. On the other hand, the cleaning step can be completely eliminated if the components are free of contaminating foreign matter. The cleaning step is merely an optional step to be used when necessary. Various types of pretreatments such as sandblasting, phosphating, etching, machining, vapor honing, etc., to produce surface recesses are desirable in providing the optimum type of surface prior to solid film deposition.

The unassembled components of the bearing are coated with a lubricating composition having a formulation in accordance with the aforementioned examples. The mixture, comprising a phosphate or borate solution having a lubricant dispersed therein, is of such consistency that it may be applied to the bearing components by spraying.

Therefore, in spraying the components of the bearing, care must be exercised to insure the application of a substantially uniform film to the components.

The bearing components are rotated while the lubricant coating is being sprayed thereon. The rotation of the components will facilitate the application of the coating to the components thereby insuring a film of substantially uniform thickness on all of the surfaces of the components.

Although spraying is the preferred method by which the coating film is applied to the bearing components, this invention also contemplates the use of any other suitable method of coating the components such as by dipping or brushing. Any suitable method may be utilized, but the method selected should insure the application of a substantially uniform film having a predetermined thickness.

After coating, the unassembled bearing components are air dried or dried at room temperature for a predetermined period. In the preferred embodiment of the invention, the coated components are air dried for one-half hour at an ambient temperature of 70° F. It will be understood of course that this preferred time and temperature are not critical and may be varied to a considerable extent far above or far below these preferred values.

After air drying, the unassembled components of the bearing are baked in an oven for a period of 16 to 24 hours at 180° F. and then 16 to 24 hours at 300° F. whereby the water is evaporated from the solution leaving a dried phosphate or borate film attached to the component parts of the bearing. Curing time and temperature may be varied depending on the performance desired.

After being heated, the unassembled components of the bearing are assembled into an operative unit to provide an anti-friction bearing substantially identical to the bearing shown in FIGURES 1 and 2 having a bonded lubricant on all of the surfaces of the components thereof and, more particularly, on the friction surfaces of the components.

Another embodiment of this invention contemplates a method wherein all of the components of an anti-friction bearing except the rolling elements or balls thereof are coated with a bonded lubricant. In other words, this method is identical with the preferred method of lubricating an anti-friction bearing with the exception that the balls are not included in the cleaning, coating, air drying and heating steps of the process. An anti-friction bearing lubricated in accordance with this embodiment of the invention would be substantially identical in structure to the anti-friction bearing shown in FIGURES 3 and 4.

Another embodiment of the present invention envisions the idea of lubricating an anti-friction bearing by coating only the cage means and the raceways in the inner and outer race means with a bonded film lubricant. In this embodiment of the invention, the inner and outer races of the bearing are masked after being cleaned to cover all of the external surfaces thereof other than the raceways therein. After the masking step, the cage means and the raceways only are coated with the lubricating composition. Aside from the masking step, this embodiment of the method is otherwise identical to the last embodiment and would result in the production of a lubricated bearing substantially identical in structure to the bearing shown in FIGURES 5 and 6.

As illustrations of specific examples performed in accordance with the invention, the following are given:

EXAMPLE I

| Ingredient | Percent by Weight | Endurance Life, minutes | Load Carrying, lbs. |
| --- | --- | --- | --- |
| Molybdenum disulfide | 56 | 123-175 | |
| Graphite | 17 | | |
| Sodium metaborate* | 27 | | |

EXAMPLE II

| Ingredient | Percent by Weight | Endurance Life, minutes | Load Carrying, lbs. |
| --- | --- | --- | --- |
| Graphite | 60 | 107-133 | |
| Sodium hexametaphosphate* | 40 | | |

EXAMPLE III

| Ingredient | Percent by Weight | Endurance Life, minutes | Load Carrying, lbs. |
| --- | --- | --- | --- |
| Graphite | 60 | 45-74 | |
| Sodium metaborate | 40 | | |

EXAMPLE IV

| Ingredient | Percent by Weight | Endurance Life, minutes | Load Carrying, lbs. |
| --- | --- | --- | --- |
| Silver sulphate | 48 | 72-80 | 2750-3250 |
| Graphite | 25 | | |
| Sodium metaborate | 27 | | |

EXAMPLE V

| Ingredient | Percent by Weight | Endurance Life, minutes | Load Carrying, lbs. |
| --- | --- | --- | --- |
| Lead fluoride | 4 | 16-17 | 2000-2250 |
| Molybdenum disulfide | 73 | | |
| Sodium hexametaphosphate | 23 | | |

EXAMPLE VI

| Ingredient | Percent by Weight | Endurance Life, minutes | Load Carrying, lbs. |
| --- | --- | --- | --- |
| Bismuth iodide | 25 | 8-9 | 1000-2000 |
| Molybdenum disulfide | 57 | | |
| Sodium hexametaphosphate | 18 | | |

*The sodium hexametaphosphate and sodium metaborate were in a solution having 42% by weight of solids.

The endurance and load carrying capacity tests of the films were conducted in a Falex Lubricant Tester according to the following procedure:

The test specimens consist of a cylindrical pin and two V-blocks. These specimens are then cleaned with a solvent such as a trichloroethylene vapor and phosphated (thermoil-granodine process). The solid film was applied according to the process hereinabove described. The V-blocks are inserted in recesses provided for them in the test apparatus, the pin is attached to a shaft which can be rotated. The V-blocks are brought to bear against the test pin, and a load of 300 lbs. is applied to the V-blocks. The test pin is rotated for a period of three minutes, after which it is stopped. The applied load is increased to 500 lbs. and the test pin is rotated for one minute. The load is increased to 1000 lbs. whereupon an endurance test measured in minutes is conducted. Failure criterion is a sudden large increase in torque or the shearing of a brass shear pin which connects the test pin to the shaft.

The load carrying test is the maximum load that these films are able to withstand without failure.

EXAMPLE VII

Ingredient: Percent by weight (film)
 PbO _____ 59
 Graphite _____ 29
 Sodium hexametaphosphate _____ 12

This film was coated upon a ball bearing in accordance with the process described above. A high speed test apparatus was used to rotate the ball at a speed of 3500 r.p.m. and a temperature of 350° F. The performance life was 14 hours.

EXAMPLE VIII

Ingredient: Percent by weight
 PbI$_2$ _____ 83
 Sodium hexametaphosphate _____ 17

A ball bearing coated with a film having this composition was rotated at 10,000 r.p.m. at a temperature of 350° F. It had a performance life of four hours.

In summary, the advantages of the present invention may be realized by providing on the bearing surfaces of relatively movable parts a thin, dry film which includes as its principal lubricating agent a solid comminuted lubricant uniformly dispersed in a dried, water-soluble, metallic hexametaphosphate or metaborate. The bonded films described in our co-pending application (Serial No. 50,046) were limited in the choice of lubricant because sodium silicate reacts with many of the aforementioned lubricants yielding a thick fluid or solid mass. The bonded films herein described are not so limited.

Obviously many modifications and variations of the present invention are possible in the light of the above teachings. It is therefore to be understood that within the scope of the appended claims the invention may be practiced otherwise than as specifically described.

What is claimed is:

1. A composition for forming a bonded film for a bearing structure consisting, on a dry-weight basis, of a mixture of at least 60% to 88% of one member selected from the group consisting of PbS, PbO, CdI$_2$, InF$_3$, ZnSo$_4$, BiI$_3$, CdF$_2$, ZrCl, ZrI, CuCl, NiF$_2$, BaO, SrO, MoS$_2$, MoO$_3$, MnCl$_2$, graphite, Ag$_2$SO$_4$, PbI$_2$ and BaS and from 40% to 12% of a member selected from the group consisting of sodium hexametaphosphate and sodium metaborate in water in amount sufficient to form a water solution of said last named member and also in amount sufficient to form a uniform mixture which upon application to said bearing structure develops thereon after evaporation of said water, solely by means of said last named member as the bonding agent, a thin, dry lubricating film bonded thereto.

2. The combination with relatively movable parts having bearing structure requiring lubrication, of a thin, dry lubricating film bonded to said bearing structure, said film consisting essentially of 12% to 40%, on a dry weight basis, of one member selected from the group consisting of dried sodium hexametaphosphate and dried sodium metaborate for bonding said film to said bearing structure and the balance of the film having at least one member selected from the group consisting of PbS, PbO, CdI$_2$, InF$_3$, ZnSO$_4$, BiI$_3$, CdF$_2$, ZrCl, ZrI, CuCl, NiF$_2$, SrO, BaO, MoS$_2$, MoO$_3$, MnCl$_2$, graphite, Ag$_2$So$_4$, PbI$_2$ and BaS uniformly dispersed throughout said film.

3. A self-contained lubricated anti-friction bearing having component parts comprising an inner race element having a raceway therein; an outer race element having a raceway therein; a plurality of rolling elements carried in said raceways and being movable relative thereto; cage means associated with said rolling elements to separate said rolling elements, the improvement therewith of a dry film lubricant bonded to at least one of said elements, said bonded film lubricant consisting essentially of 60% to 88%, on a dry-weight basis, of a solid comminuted lubricant dispersed in 40% to 12%, on a dry-weight basis, of a bonding agent selected from the group consisting of sodium metaborate and sodium hexametaphosphate.

4. The combination with relatively movable parts having bearing surfaces requiring lubrication, of a thin, dry, lubricating film bonded to at least one of said surfaces, said bonded lubricating film consisting essentially of 60% to 88%, on a dry-weight basis, of a solid comminuted lubricant dispersed throughout a bonding agent selected from the group consisting of sodium metaborate and sodium hexametaphosphate, said bonding agent of said film being present on a dry-weight basis from 40% to 12%.

References Cited by the Examiner

UNITED STATES PATENTS

| | | | |
|---|---|---|---|
| 2,466,642 | 4/49 | Larsen | 252—25 |
| 2,697,645 | 12/54 | Mitchell | 308—188 |
| 2,901,380 | 8/59 | Crump | 308—241 |
| 3,051,586 | 8/62 | Heath et al. | 308—240 |

OTHER REFERENCES

"Bonded Coatings Lubricate Metal Parts," by Disapio in Product Engineering, Sept. 5, 1960, pages 48–53.

DANIEL E. WYMAN, *Primary Examiner.*

JOSEPH R. LIBERMAN, *Examiner.*